United States Patent
Yun et al.

(10) Patent No.: US 8,463,192 B2
(45) Date of Patent: Jun. 11, 2013

(54) MOBILE DEVICE, SYSTEM, AND METHOD FOR MEASURING CHARACTERISTICS OF THE MOBILE DEVICE

(75) Inventors: Yong Seob Yun, Gumi-si (KR); Kwang Sik Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 406 days.

(21) Appl. No.: 12/402,314

(22) Filed: Mar. 11, 2009

(65) Prior Publication Data

US 2009/0264078 A1 Oct. 22, 2009

(30) Foreign Application Priority Data

Apr. 22, 2008 (KR) ........................ 10-2008-0037037

(51) Int. Cl.
*H04B 17/00* (2006.01)

(52) U.S. Cl.
USPC ........................ 455/67.11; 455/73; 455/562.1

(58) Field of Classification Search
USPC .............. 455/67.14, 418, 419, 420, 423, 424, 455/557
See application file for complete search history.

(56) References Cited

U.S. PATENT DOCUMENTS

| 5,710,984 | A | 1/1998 | Millar et al. |
| 5,923,297 | A * | 7/1999 | Kim et al. ..................... 343/702 |
| 6,943,739 | B1 * | 9/2005 | Rousu et al. .................. 343/702 |
| 7,020,443 | B2 * | 3/2006 | Talvitie et al. ............. 455/67.14 |
| 7,174,132 | B2 * | 2/2007 | Lilja et al. .................. 455/67.11 |
| 2004/0097269 | A1 | 5/2004 | Lilja et al. |
| 2007/0231937 | A1 * | 10/2007 | Kurashima et al. ............. 438/17 |
| 2009/0256644 | A1 * | 10/2009 | Knudsen et al. ................ 333/32 |

FOREIGN PATENT DOCUMENTS

| KR | 10-2004-0045978 A | 6/2004 |
| KR | 10-2007-0055186 A | 5/2007 |

* cited by examiner

*Primary Examiner* — Joseph Chang
*Assistant Examiner* — Jeffrey Shin
(74) *Attorney, Agent, or Firm* — Jefferson IP Law, LLP

(57) ABSTRACT

A system and a method for measuring characteristics of a mobile device are provided. The mobile device includes an antenna connection pad connected to an antenna, a Radio Frequency (RF) unit connected to the antenna connection pad for transmitting RF signals through the antenna and for receiving RF signals through the antenna, a switch coupled between the antenna connection pad and the RF unit for operating according to an electrical signal and a contact pad connected to a measuring cable and located between the switch and the RF unit.

16 Claims, 4 Drawing Sheets

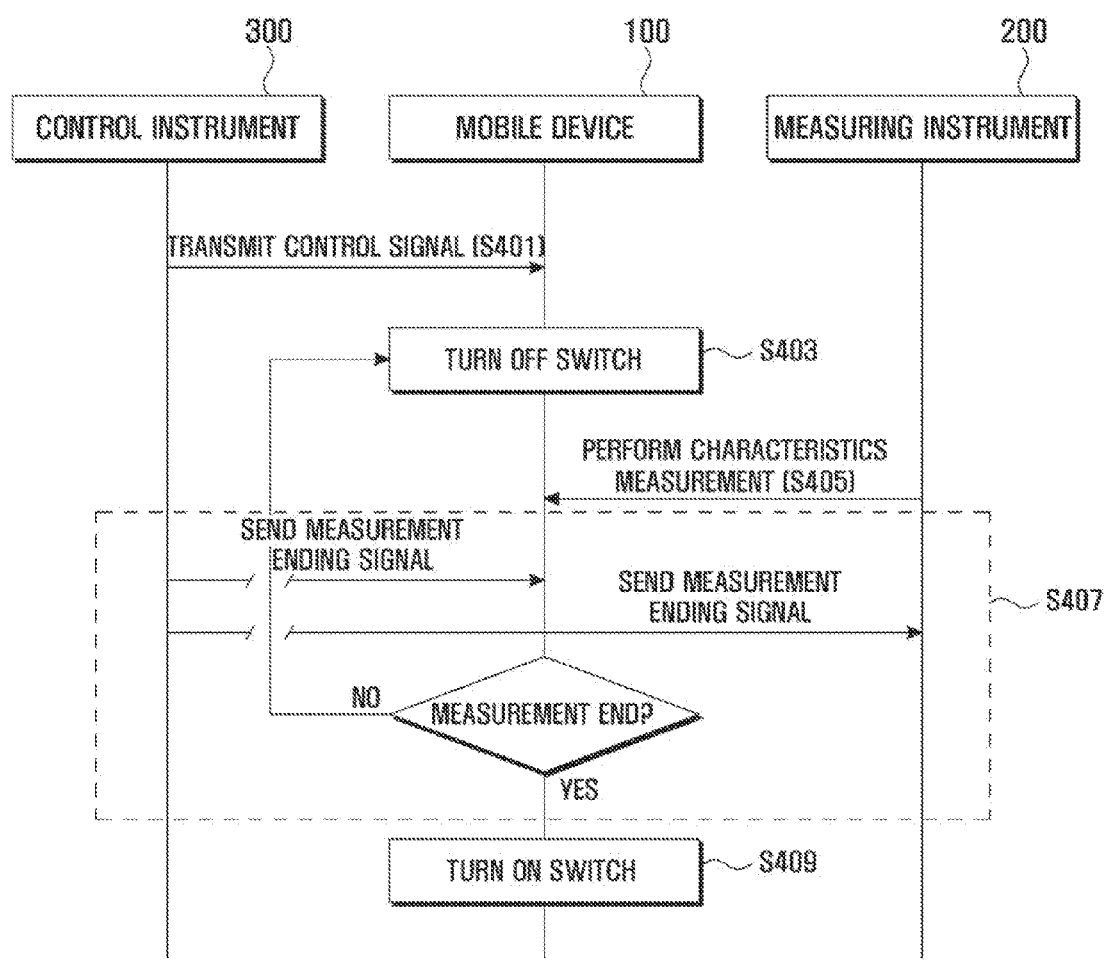

MOBILE DEVICE, SYSTEM, AND METHOD FOR MEASURING CHARACTERISTICS OF THE MOBILE DEVICE

PRIORITY

This application claims the benefit under 35 U.S.C. §119(a) of a Korean patent application filed in the Korean Intellectual Property Office on Apr. 22, 2008 and assigned Serial No. 10-2008-0037037, the entire disclosure of which is hereby incorporated by reference.

BACKGROUND OF THE INVENTION

1. Field of the Invention

The present invention relates to mobile device technology. More particularly, the present invention relates to a mobile device and a system and method for measuring characteristics of the mobile device.

2. Description of the Related Art

One purpose of measuring characteristics of a mobile device is to determine its performance. Several characteristics may be measured, such as transmission/reception characteristics, operation characteristics and the like, under conditions similar to real use conditions by using a separate measuring instrument. To execute characteristics measurement, a conventional mobile device has an RF switch, which is a mechanical switch, mounted on a printed circuit board therein. The RF switch can control RF signal paths interposed between an antenna connection pad and a duplexer. That is, the RF switch establishes an RF signal path between a duplexer and an antenna connection pad in normal use, and switches the RF signal path to a path between a duplexer and an external measuring instrument when a cable for measurement is connected.

However, the RF switch may have a relatively higher cost, which increases an entire cost of a mobile device. Additionally, an RF switch structure may have a relatively large-size because the RF switch accepts and fixes a measuring cable. Accordingly, the large size of the RF switch structure prevents the RF switch from being provided in a slim and small mobile device.

If a metallic substance is located adjacent to an antenna of a mobile device, transmission/reception performance (i.e., radiation performance) of the mobile device is generally deteriorated. Therefore, the RF switch, located near an antenna, should be distanced far from the antenna. However, separating the RF switch from an antenna may be difficult in a slim and small mobile device.

Therefore, a need exists for a mobile device and a system and method for measuring characteristics of the mobile device including an electrical switch for improving radiation performance.

SUMMARY OF THE INVENTION

An aspect of the present invention is to address at least the above-mentioned problems and/or disadvantages and to provide at least the advantages described below. Accordingly, an aspect of the present invention is to provide a mobile device that includes an electrical switch with a relatively lower cost and a contact pad connected to a measuring cable In accordance with an aspect of the present invention, a mobile device is provided. The mobile device includes an antenna connection pad connected to an antenna, a Radio Frequency (RF) unit connected to the antenna connection pad for transmitting RF signals through the antenna and for receiving RF signals through the antenna, a switch coupled between the antenna connection pad and the RF unit for operating according to an electrical signal, and a contact pad connected to a measuring cable and coupled between the switch and the RF unit.

In accordance with another aspect of the present invention, a system for measuring characteristics is provided. The system includes a mobile device including an antenna, a Radio Frequency (RF) unit for transmitting RF signals through the antenna and for receiving RF signals through the antenna, and a switch coupled between the antenna and the RF unit and for operating according to an electrical signal, a measuring instrument for measuring characteristics of the mobile device when the switch is turned off, and a control instrument for controlling the mobile device and the measuring instrument to measure characteristics of the mobile device.

In accordance with yet another aspect of the present invention, a method for measuring characteristics of a mobile device is provided. The method includes transmitting a control signal for turning off a switch to the mobile device by a control instrument connected to the mobile device, turning off the switch at the mobile device when the control signal is received, measuring characteristics of the mobile device at a measuring instrument connected to the mobile device when the switch is turned off, and turning on the switch at the mobile device after the measuring of the characteristics ended.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 4 is a flow diagram illustrating a method for measuring characteristics of a mobile device according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary mobile devices, such as portable devices, handheld devices, and the like, may be capable of characteristics measurement according to an exemplary embodiment of the present invention. The devices may include mobile communication devices, digital broadcast devices, mobile computers, Personal Digital Assistants (PDA), smart phones, International Mobile Telecommunication 2000 (IMT-2000) devices, Code Division Multiple Access (CDMA) devices, Wideband CDMA (WCDMA) devices, Global System for Mobile communications (GSM) devices, General Packet Radio Service (GPRS) devices, Universal Mobile Telecommunication Service (UMTS) devices and the like.

Figure 1:
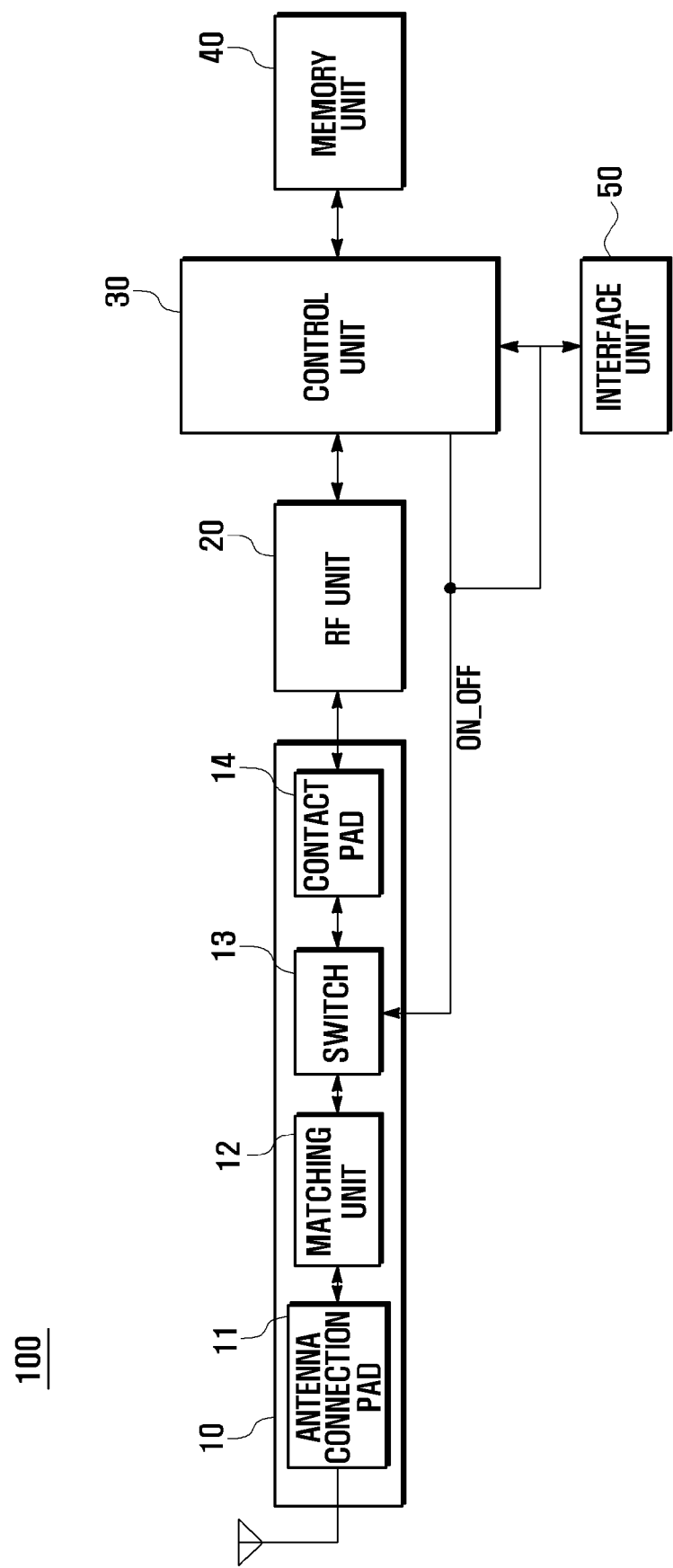
FIG. 1 is a block diagram illustrating a configuration of a mobile device according to an exemplary embodiment of the present invention.

FIG. 1 is a block diagram illustrating a configuration of a mobile device according to an exemplary embodiment of the present invention.

Referring to FIG. 1, the mobile device 100 includes a characteristics measuring unit 10, a Radio Frequency (RF) unit 20, a control unit 30, a memory unit 40, and an interface unit 50.

The characteristics measuring unit 10 is located between the RF unit 20 and an antenna of the mobile device 100. The characteristics measuring unit 10 controls a path of RF signals under the control of the control unit 30, thus allowing measurement of characteristics of the mobile device 100 including the characteristics of the RF unit 20. The characteristics measuring unit 10 includes an antenna connection pad 11 connected to the antenna, a matching unit 12 for reducing a loss of RF signals, a switch 13 for switching RF signal paths and a contact pad 14 connected to a measuring cable. These elements of the characteristics measuring unit 10 will be described later with reference to FIG. 2.

The RF unit 20 transmits and receives RF signals. The RF unit 20 includes an RF transmitter (not illustrated) that up-converts a frequency of a signal to be transmitted and amplifies the signal, an RF receiver (not illustrated) that down-converts a frequency of a received signal and low-noise amplifies the signal, and a duplexer (not illustrated) that isolates the reception frequency from the transmission frequency. More particularly, the RF unit 20 transmits and receives RF signals to and from a measuring instrument (not illustrated) under the control of the control unit 30 while the mobile device 100 is subjected to characteristics measurement. The measuring instrument will be described below.

The control unit 30 controls signal flows between function blocks in the mobile device 100 and provides control signals required for operation of the mobile device 100. More particularly, the control unit 30 controls the switch 13 to switch RF signal paths. That is, in normal use, the control unit 30 closes (i.e., turns on) the switch 13 to connect an RF signal path between the antenna and the RF unit 20. However, for measuring characteristics of the mobile device 100, the control unit 30 opens (i.e., turns off) the switch 13 to disconnect an RF signal path between the antenna and the RF unit 20 and establishes an RF signal path between the RF unit 20 and an external measuring instrument. For example, when receiving a measurement signal from a control instrument or receiving an interrupt signal generated by a connection between the interface unit 50 and an external instrument (such as a control instrument or a jig box), the control unit 30 turns off the switch 13. The external instrument, such as the control instrument, will be described below.

While characteristics of the mobile device 100 are measured, the control unit 30 controls each functional unit of the mobile device 100 according to control commands of the measuring instrument. For example, if a call request message is received, the control unit 30 drives a speaker (not illustrated) or a vibration motor (not illustrated) to inform the reception of a call. Also, in a case of a transmission power control command, the control unit 30 controls a Power Amplifier Module (PAM) of the RF unit 20 to regulate a transmission power.

Still referring to FIG. 1, the memory unit 40 stores a variety of application programs required for operation of the mobile device 100 and may include a program region and a data region.

The program region stores an Operating System (OS) for booting the mobile device 100, an application program required for playing multimedia contents and other application programs for performing optional functions, such as a camera, an audio replay, an image or video replay, and the like. More particularly, the program region may store a program that controls opening or closing of the switch 13 according to a control signal (ON_OFF).

The data region stores data created in use of the mobile device 100. Specifically, the data region may store phonebook data, audio data, contents, metadata related to contents and any other user-related data.

The interface unit 50 is configured to be connected to external instruments, such as a battery charger, a data cable and the like. Various connectors with different shapes, such as 24-pin or 20-pin connectors, may be used for the interface unit 50. Additionally, the interface unit 50 may include at least one terminal for Universal Serial Bus (USB) communication, Universal Asynchronous Receiver Transmitter (UART) communication, battery charging and the like. More particularly, the interface unit 50 may be connected to the external instrument for measurement of characteristics of the mobile device 100. The interface unit 50 may include a terminal for providing an interrupt signal to the control unit 30 if the external instrument is connected. The interrupt signal may be transmitted directly to the switch 13 instead of the control unit 30. On the other hand, the external instrument is a device that creates a control signal (ON_OFF) for opening or closing the switch 13 in characteristics measurement. The external instrument may be connected to the interface unit 50 and may transmit an interrupt signal to the control unit 30. A control instrument or a jig box capable of supplying power to the mobile device 100 may be used as one of the external instruments.

Although not illustrated, the mobile device 100 may further selectively include well-known elements, such as a display unit, a camera module, a broadcast receiving module, a speaker, a microphone, an MP3 module and any other equivalents.

Figure 2:
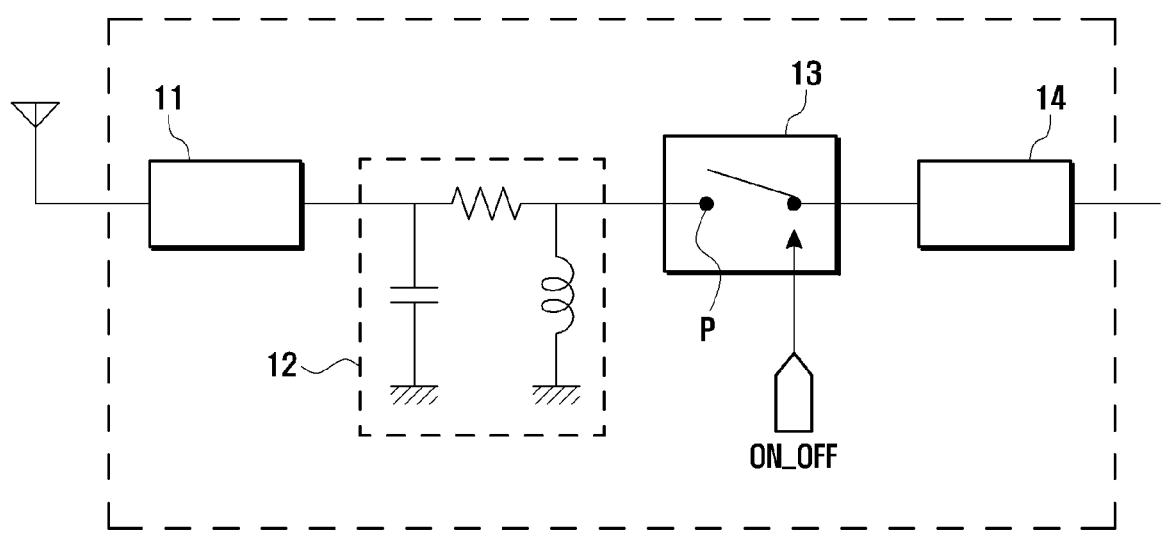
FIG. 2 is a view illustrating a characteristics measuring unit of a mobile device according to an exemplary embodiment of the present invention.

FIG. 2 is a view illustrating a characteristics measuring unit of a mobile device according to an exemplary embodiment of the present invention.

Referring to FIGS. 1 and 2, the characteristics measuring unit 10 includes the antenna connection pad 11, the matching unit 12, the switch 13 and the contact pad 14, as described above.

The antenna connection pad 11 is a terminal connected to the antenna, allowing transmission and reception of RF signals to and from the antenna.

The matching unit 12 is used for impedance matching between the RF unit 20 and the antenna to reduce a power loss of RF signals. If RF signals are transmitted to another apparatus with different impedance, a standing wave is produced in general due to attenuation or reflection. Unfortunately, the standing wave may cause a drop in transmission/reception performance of the mobile device 100. In order to prevent the drop in the transmission/reception performance, the matching unit 12 is interposed between the antenna connection pad 11 and the switch 13. The matching unit 12 may use a stub form, a quarter-wave transformer form, a lumped LC form using an inductor and a capacitor and the like. Although an exemplary embodiment of the present invention uses the lumped LC form, the lumped LC form is exemplary only and not to be considered as a limitation of the present invention. On the other hand, the matching unit 12 may be omitted if the RF unit 20 has the same impedance as the antenna.

The switch 13 connects or disconnects an RF signal path to the antenna connection pad 11. The switch 13 is an electrical switch electrically coupled in series with the antenna connection pad 11 and the RF unit 20, and operates according to a control signal (ON_OFF). An exemplary embodiment of the present invention is not limited to a specific kind of electrical switch and may alternatively employ any other suitable switches which may operate according to an electrical signal. While the mobile device 100 is subjected to characteristics measurement, the switch 13 is turned off, namely, in a high impedance state. Thereby, the switch 13 disconnects an RF signal path between the antenna connection pad 11 and the RF unit 20. Therefore, during characteristics measurement, a reception signal in the antenna is not conveyed to the measuring equipment, and a transmission signal in the RF unit 20 is not dispersed toward the antenna. On the contrary, in normal use, the switch 13 is turned on and thereby connects an RF signal path between the antenna connection pad 11 and the RF unit 20. For example, the switch 13 may be closed or opened at a point P.

The control signal (ON_OFF) may be at a high level when the switch 13 is off and may be at a low level when the switch 13 is on. However, the present invention is not limited thereto. Namely, the control signal (ON_OFF) may be at a low level when the switch 13 is off and may be at a high level when the switch 13 is on.

The contact pad 14, which is connected to a measuring cable, is located between the switch 13 and the RF unit 20. Although FIG. 2 illustrates the contact pad 14 having a rectangular shape, the present invention is not limited to a specific shape. Any other suitable shapes with various sizes may be alternatively used for the contact pad 14. In an exemplary implementation, to reduce a signal loss from a long line and provide more exact and reliable measurement, the contact pad 14 may be in close vicinity to the switch 13 and the RF unit 20.

The characteristics measuring unit 10 having the above described configuration does not form an RF signal path between the antenna and the RF unit 20, during characteristics measurement, to prevent a transmission signal in the RF unit 20 from being dispersed toward the antenna and to prevent a reception signal in the antenna from being transmitted to the measuring equipment. The characteristics measuring unit 10 forms an RF signal path between the antenna and the RF unit 20, after characteristics measurement, to permit wireless communication with the base station through the antenna.

Figure 3:
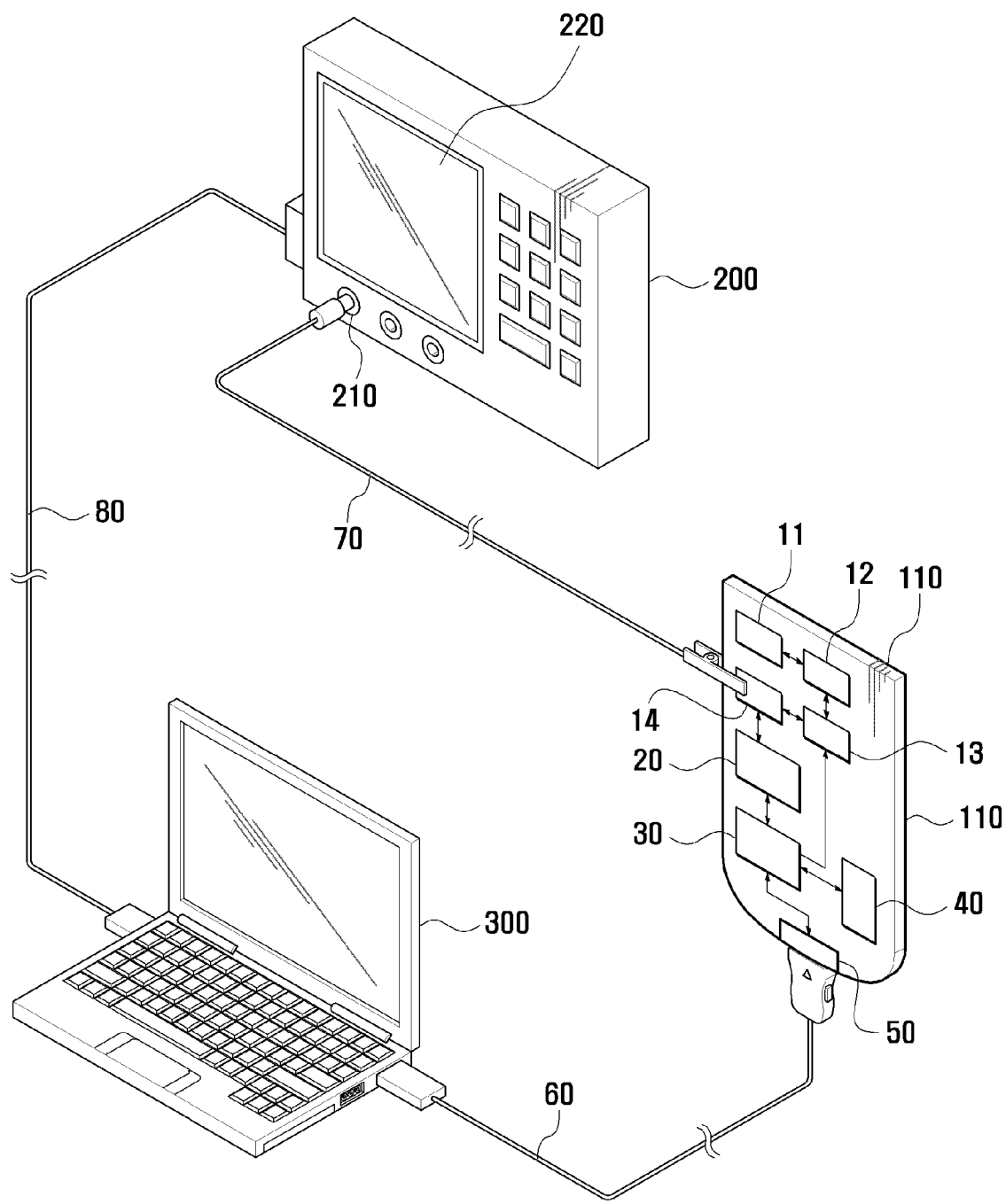
FIG. 3 is a perspective view illustrating a system for measuring characteristics of a mobile device according to an exemplary embodiment of the present invention.

FIG. 3 is a perspective view illustrating a system for measuring characteristics of a mobile device according to an exemplary embodiment of the present invention.

An automatic measurement may be employed in which a measuring instrument 200 automatically measures the characteristics of the mobile device 100 under the control of a control instrument 300. However, the present invention is not limited thereto. In an exemplary implementation, a manual measurement may be employed by a user's control in which the measuring instrument 200 manually measures the characteristics of the mobile device 100. Furthermore, a Printed Circuit Board (PCB) 110, which is a part of the mobile device 100, may be used for characteristics measurement. However, the present invention is not limited thereto.

Referring to FIGS. 1 to 3, a system for measuring the characteristics of the mobile device 100 includes the measuring instrument 200, the control instrument 300 having an automatic measurement program, the PCB 110, a measuring cable 70, a data cable 60 and a communication cable 80.

In the measuring system, the control instrument 300 transmits measuring instructions to both the PCB 110 of the mobile device 100 and the measuring instrument 200. When the measuring instructions are received, the switch 13 of the mobile device 100 is turned off. Also, under the measuring instructions of the control instrument 300, the measuring instrument 200 establishes measuring conditions, transmits RF signals depending on the measuring conditions to the mobile device 100, and receives resultant signals from the mobile device 100.

The PCB 110 of the mobile device 100 has a variety of components necessary for the operation of the mobile device 100. Such components are mounted on the PCB 110 and electrically coupled to each other through lines on and in the PCB 110.

The measuring instrument 200 is a device that measures the characteristics of the mobile device 100. The measuring instrument 200 has an input/output unit 210, which is connected to the contact pad 14 of the mobile device 100 through the measuring cable 70. Namely, the measuring instrument 200 transmits and receives RF signals to and from the mobile device 100 through the measuring cable 70. Specifically, the measuring instrument 200 establishes measuring conditions under the measuring instructions of the control instrument 300 or according to a user's input, and transmits RF signals depending on the measuring conditions to the mobile device 100. The measuring instrument 200 then receives and analyzes RF signals that the mobile device 100 transmits as results of operation under the measuring conditions, and may also provide measuring results on a display unit 220. Additionally, the measuring instrument 200 may transmit the measuring results to the control instrument 300.

The control instrument 300 controls both the measuring instrument 200 and the mobile device 100 to enable the measuring instrument 200 to automatically measure the characteristics of the mobile device 100. Furthermore, the control instrument 300 may function as a power supply that provides electrical power to the mobile device 100.

The control instrument 300 transmits the measuring instructions to both the mobile device 100 and the measuring instrument 200. The measuring instructions may include instructions to open (i.e., turn off) the switch 13 of the mobile device 100 and instructions to establish measuring conditions of the measuring instrument 200. Additionally, the control instrument 300 may transmit instructions to close (i.e., turn on) the switch 13 to the mobile device 100 after measurement is completed, and may also receive measuring results from the measuring instrument 200.

In an exemplary embodiment of the present invention, a separate jig box may be used for supplying power to the mobile device 100 and/or for controlling the switch 13. In this case, the jig box is located between the control instrument 300 and the mobile device 100 and is controlled by the control instrument 300.

The measuring cable 70 connects the measuring instrument 200 and the contact pad 14, and may be formed of a coaxial cable, an optical cable and the like. A first end of the measuring cable 70 is fixedly inserted into the input/output unit 210 of the measuring instrument 200. A second end of the measuring cable 70 is connected to the contact pad 14 of the PCB 110. In FIG. 3, the second end of the measuring cable 70 is illustrated as having a clamp shape formed of a pair of gripping sides. Here, one gripping side toward the contact pad 14 may be formed of a conductor, whereas the other gripping side may be formed of a nonconductor. A clamp shaped end of the measuring cable 70 is exemplary only and should not be construed as a limitation of the present invention. The second end of the measuring cable 70 may have another shape suitable for maintaining electrical contact with the contact pad 14.

The communication cable 80 and the data cable 60 are commonly used for connecting ports of electronic equipments. In an exemplary implementation, the communication cable 80 connects the measuring instrument 200 with the control instrument 300, and the data cable 60 connects the mobile device 100 with the control instrument 300. Both cables 80 and 60 are exemplary only and should not be construed as a limitation of the present invention.

FIG. 4 is a flow diagram illustrating a method for measuring characteristics of a mobile device according to an exemplary embodiment of the present invention.

Referring to FIG. 4 along with FIGS. 1 to 3, the control instrument 300 transmits a control signal (ON_OFF) to the mobile device 100 in step S401. The control signal (ON_OFF) may be an interrupt signal to turn off the switch 13 of the mobile device 100. The interrupt signal may be transmitted to at least one of the control unit 30 and the switch 13.

On receipt of the control signal (ON_OFF), the mobile device 100 turns off the switch 13 to disconnect an RF signal path between the RF unit 20 and the antenna in step S403. Accordingly, a reception signal in the antenna may be prevented from being conveyed to the measuring equipment and a transmission signal in the RF unit 20 may be prevented from being dispersed toward the antenna. The control signal (ON_OFF) to turn off the switch 13 may be high level or low level according to a designer's intention.

The mobile device 100 performs a predefined process of characteristics measurement under the control of the measuring instrument 200 in step S405. The characteristics measurement may be performed manually according to a user's manipulation or performed automatically under the control of the control equipment 300.

The mobile device 100 determines whether a process of characteristics measurement is completed in step S407. Here, the mobile device 100 may determine that the measurement process has ended when the control instrument 300 transmits a measurement ending signal to the measuring instrument 200 and the mobile device 100. Additionally, the mobile device 100 may determine that the measurement process has ended when the control instrument 300 providing the control signal (ON_OFF) is disconnected. For example, if an interrupt signal is not received, the control instrument 300 is regarded as disconnected.

If the measurement process is completed, the mobile device 100 turns on the switch 13 to connect an RF signal path between the RF unit 20 and the antenna in step S409. For example, in FIG. 2, the switch 13 is closed at a point P according to the control signal (ON_OFF). On the contrary, if it is determined in step S407 that the measurement process did not end, the mobile device 100 goes to step S403 to maintain the turn off state of the switch 13. Namely, as illustrated in FIG. 2, the switch 13 keeps open at a point P. Thereby, an RF signal path between the RF unit 20 and the antenna continues to be disconnected. Accordingly, a transmission signal in the RF unit 20 may be prevented from being dispersed toward the antenna and a reception signal in the antenna may be prevented from being conveyed to the measuring equipment.

As described above, a mobile device and related measuring system and method of an exemplary embodiment of the present invention do not require a conventional RF switch, which has a relatively higher cost. Therefore, production cost of the mobile device may be reduced and radiation performance may be improved. Furthermore, the use of an electrical switch instead of a conventional RF switch may allow effective utilization in internal space of the mobile device.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile device comprising:
an antenna connection pad connected to an antenna;
a Radio Frequency (RF) unit connected to the antenna connection pad for transmitting RF signals through the antenna and for receiving RF signals through the antenna;
a switch coupled between the antenna connection pad and the RF unit for operating according to an external electrical control signal; and
a contact pad connected to a measuring cable of a measuring instrument and coupled between the switch and the RF unit.

2. The device of claim 1, further comprising:
a matching unit coupled between the antenna connection pad and the switch for matching impedance between the RF unit and the antenna.

3. The device of claim 1, further comprising:
a control unit for controlling of the switch when the RF unit is subjected to characteristics measurement.

4. The device of claim 1, further comprising:
an interface unit for connecting with an external instrument comprising at least one of a jig box and a control instrument, the external instrument provides an interrupt signal to control the switch.

5. The device of claim 4, wherein the interrupt signal is transmitted to the switch to turn off the switch.

6. The device of claim 4, wherein the interrupt signal is transmitted to a control unit and the control unit turns off the switch.

7. A system for measuring characteristics, the system comprising:
a mobile device comprising an antenna, a Radio Frequency (RF) unit for transmitting RF signals through the antenna and for receiving RF signals through the antenna, and a switch coupled between the antenna and the RF unit for operating according to an electrical signal;

a measuring instrument for measuring characteristics of the mobile device when the switch is turned off; and a control instrument for supplying power to the mobile device, for controlling the mobile device and the measuring instrument to measure characteristics of the mobile device, and for providing an interrupt signal to control the switch.

8. The system of claim 7, wherein the interrupt signal is transmitted to the switch to turn off the switch.

9. The system of claim 7, wherein the interrupt signal is transmitted to a control unit of the mobile device and the control unit turns off the switch.

10. A method for measuring characteristics of a mobile device, the method comprising:

transmitting a control signal for turning off a switch to the mobile device and for supplying power to the mobile device by a control instrument externally connected to the mobile device;

turning off the switch at the mobile device when the control signal is received;

measuring characteristics of the mobile device at a measuring instrument connected to the mobile device when the switch is turned off;

receiving, from the control instrument, a measurement ending signal to the mobile device and the measuring instrument; and turning on the switch at the mobile device after the measuring of the characteristics ended.

11. The method of claim 10, wherein the mobile device comprises an antenna, a Radio Frequency (RF) unit for transmitting RF signals through the antenna and for receiving RF signals through the antenna, and further wherein the switch is coupled between the antenna and the RF unit for operating according to an electrical signal.

12. The method of claim 10, wherein the turning off of the switch comprises disconnecting an RF signal path between the RF unit and the antenna.

13. The method of claim 10, wherein the turning on of the switch comprises connecting the RF signal path between the RF unit and the antenna.

14. The method of claim 10, wherein the control signal is directly transmitted to the switch.

15. The method of claim 10, wherein the control signal is transmitted to a control unit of the mobile device and the control unit turns off the switch.

16. The method of claim 15, wherein the control signal comprises an interrupt signal.

\* \* \* \* \*